(12) United States Patent
Chien

(10) Patent No.: US 7,729,020 B2
(45) Date of Patent: *Jun. 1, 2010

(54) TRANSMISSION MECHANISM OF IMAGE SCANNER WITH ADJUSTABLE RESOLUTION

(76) Inventor: Chuwn-Jen Chien, 4Fl., No. 16, Lane 107, Changshuen St., Wanhua Chlu, Taipei (TW) 108

( * ) Notice: Subject to any disclaimer, the term of this patent is extended or adjusted under 35 U.S.C. 154(b) by 590 days.

This patent is subject to a terminal disclaimer.

(21) Appl. No.: 11/550,572

(22) Filed: Oct. 18, 2006

(65) Prior Publication Data

US 2007/0127088 A1 Jun. 7, 2007

Related U.S. Application Data

(63) Continuation of application No. 10/122,025, filed on Apr. 12, 2002, now Pat. No. 7,154,639.

(30) Foreign Application Priority Data

Oct. 25, 2001 (TW) .............................. 90126441 A

(51) Int. Cl.
*H04N 1/04* (2006.01)
*H04N 1/00* (2006.01)
*F16H 3/04* (2006.01)
*F16H 3/34* (2006.01)

(52) U.S. Cl. ...................... 358/497; 358/400; 358/474; 358/498; 74/332; 74/354

(58) Field of Classification Search ....................... None
See application file for complete search history.

(56) References Cited

U.S. PATENT DOCUMENTS 5,226,639 A * 7/1993 Kida et al. ................... 271/109
5,862,446 A * 1/1999 Hashizume et al. ......... 399/367
6,189,395 B1 * 2/2001 Lee .............................. 74/332
6,736,502 B2   5/2004 Deguchi
6,744,538 B2 * 6/2004 Chen ........................... 358/474
6,765,698 B1 * 7/2004 Ha ............................... 358/474
6,948,871 B1 * 9/2005 Onishi et al. ................. 400/679
7,187,477 B2 * 3/2007 Chen ........................... 358/412
2003/0174355 A1   9/2003 Suehiro

* cited by examiner

*Primary Examiner*—Twyler L Haskins
*Assistant Examiner*—Barbara D Reinier
(74) *Attorney, Agent, or Firm*—Workman Nydegger

(57) ABSTRACT

A transmission mechanism of an image scanner with adjustable resolution is disclosed. The transmission device is driven by a step motor to move a carriage to perform a scanning operation at a selected speed The transmission device includes a transmission control set switched between a first and a second transmission states in response to a command for changing a moving speed of the carriage, and driven by the step motor to output a transmission power; a first transmission set of a first deceleration ratio, coupled with the transmission control set to receive the transmission power from the transmission control set in the first transmission state, and providing the transmission power for the carriage to have the carriage move at a first speed; and a second transmission set of a second deceleration ratio different from the first deceleration ratio, coupled with the transmission control set to receive the transmission power from the transmission control set in the second transmission state, and providing the transmission power for the carriage to have the carriage move at a second speed.

17 Claims, 9 Drawing Sheets

TRANSMISSION MECHANISM OF IMAGE SCANNER WITH ADJUSTABLE RESOLUTION

This application is a continuation of U.S. patent application Ser. No. 10/122,025 filed Apr. 12, 2002 now U.S. Pat. No. 7,154,639.

FIELD OF THE INVENTION

The present invention relates to a transmission mechanism of an image scanner, and more particularly to a transmission mechanism of an image scanner with adjustable resolution.

BACKGROUND OF THE INVENTION

Nowadays, image scanners have become common peripheral equipment of computers. As known, resolution of an image scanner is one of the important indices to evaluate a scanner. In general, resolution consists of two components, i.e. horizontal resolution and vertical resolution. The horizontal resolution depends on the specification of the optical system, the pixel number of the image pickup device such as a charge-coupled device (CCD) and/or hardware circuitry. The vertical resolution, on the other hand, relates to the operations of the transmission device 11 and step motor 12 shown in FIG. 1.

An advanced image scanner provides two options for users. The image scanner may perform a scanning operation on the conditions of a relatively high speed but relatively low resolution. Alternatively, the scanning operation may be performed on the conditions of a relatively high resolution but a relatively low speed. The prior art technique adjusts the scanning resolution and speed by changing the revolving speed of the step motor. However, the motor at a high revolving speed generates significant noise, and is required to be a high torque motor that is of high cost and bulky.

SUMMARY OF THE INVENTION

Therefore, an object of the present invention is to provide a transmission mechanism of an image scanner, which facilitates the resolution of the image scanner to be adjusted without changing the revolving speed of the step motor.

A first aspect of the present invention relates to a transmission device for use in an image scanner. The transmission device is driven by a step motor to move a carriage to perform a scanning operation at a selected speed, and includes a transmission control set switched between a first and a second transmission states in response to a command for changing a moving speed of the carriage, and driven by the step motor to output a transmission power; a first transmission set of a first deceleration ratio, coupled with the transmission control set to receive the transmission power from the transmission control set in the first transmission state, and providing the transmission power for the carriage to have the carriage move at a first speed; and a second transmission set of a second deceleration ratio different from the first deceleration ratio, coupled with the transmission control set to receive the transmission power from the transmission control set in the second transmission state, and providing the transmission power for the carriage to have the carriage move at a second speed.

In an embodiment, the transmission control set includes an active gear synchronously rotating with a shaft of the step motor; two follower gears engaging with the active gear to be transmitted by the active gear; and a swing arm connecting the two follower gears with each other, and swinging between a first position to allow the follower gears to engage with the first transmission set and a second position to allow the follower gears to engage with the second transmission set. The swing arm swings to the first position in response to a first rotating direction of the shaft of the step motor, and swings to the second position in response to a second rotating direction of the shaft opposite to the first rotating direction.

Preferably, the transmission control set further includes a holder optionally holding the swing arm to fix a configuration of the transmission device to allow the carriage to move at the selected speed; and an electromagnetic valve coupled with the holder for retracting the holder to release the swing arm in order to change the moving speed of the carriage, and protracting the holder to confine the swing arm in order to fix the configuration of the transmission device for the scanning operation. The holder is connected to one end of a spring which is fixed at the other end thereof, and the spring stretches when the electromagnetic valve is activated to retract the holder, and recovers to protract the holder when the electromagnetic valve is deactivated.

Preferably, the first and second transmission devices are a first and a second gear sets, respectively, and the first and second gears sets include a common gear that moves the carriage via a cyclic belt.

A second aspect of the present invention relates to a transmission device for use in an image scanner which is driven by a step motor to move an image pickup device relative to a scanned object via a moving element to perform a scanning operation at a selected speed. The transmission device includes a state controller for determining a transmission state of the transmission device according to the selected speed; a first gear set of a first deceleration ratio, connected between the step motor and the moving element to move the image pickup device relative to the scanned document at a first speed in a first transmission state; and a second gear set of a second deceleration ratio which differs from the first deceleration ratio, connected between the step motor and the moving element to move the image pickup device relative to the scanned object at a second speed in a second transmission state.

In an embodiment, the state controller includes an active gear coupled and synchronously rotating with a shaft of the step motor; two follower gears engaging with the active gear to be transmitted by the active gear; and a swing arm connecting the two follower gears with each other, and swinging between a first position to allow the first gear set to engage with the follower gears to be connected to the step motor and a second position to allow the second gear set to engage with the follower gears to be connected to the step motor. The swing arm swings to the first position in response to a first rotating direction of the shaft of the step motor, and swings to the second position in response to a second rotating direction of the shaft opposite to the first rotating direction.

Preferably, the moving element includes a cyclic belt for moving the image pickup device in a flatbed scanner. In an auto-feeding scanner, on the other hand, includes a roller for moving the scanned object.

A third aspect of the present invention relates to an image scanner with adjustable resolution. The image scanner includes an image pickup device for converting an image of a scanned object into digital data; a step motor providing a moving power for a relative movement of the image pickup device to the scanned object to complete scanning; a first gear set driven by the step motor to transmit the moving power, and switched to either of a first and a second positions for adjusting resolution; a second gear set of a first deceleration ratio, located at a position corresponding to the first position of the first gear set for optionally engaging with the first gear set so as to receive and further transmit the moving power in a first manner; a third gear set of a second deceleration ratio, located at a position corresponding to the second position of the first gear set for optionally engaging with the first gear set to further transmit the moving power in a second manner; and a moving element coupled with both of the second and third gear sets, and receiving the moving power from the one of the second and third sets, which engages with the first gear set, to move the image pickup device relative to the scanned object at a selected speed, thereby adjusting resolution of the image scanner.

Preferably, the first gear set includes an active gear coupled and synchronously rotating with a shaft of the step motor; two follower gears engaging with the active gear to be transmitted by the active gear; and a swing arm connecting the two follower gears with each other, and swinging between the first position to allow the second gear set to engage with the follower gears and the second position to allow the third gear set to engage with the follower gears.

Preferably, the image scanner further includes a holder optionally holding the swing arm to fix a configuration of the first, second and third gear sets to allow the moving power to be transmitted in a certain one of the first and second manners; and an electromagnetic valve coupled with the holder for retracting the holder to release the swing arm for resolution adjustment, and protracting the holder to confine the swing arm for scanning operation. The holder is connected to one end of a spring which is fixed at the other end thereof, and the spring stretches when the electromagnetic valve is activated to retract the holder, and recovers to protract the holder when the electromagnetic valve is deactivated.

The image scanner can be a flatbed scanner, and the moving element includes an end gear engaging with both of the second and third gear sets; and a cyclic belt transmitted by the end gear to move the image pickup device.

The image scanner can also be an auto-feeding scanner, and the moving element includes an end gear engaging with both of the second and third gear sets; and a roller synchronously rotating with the end gear to feed the scanned object.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
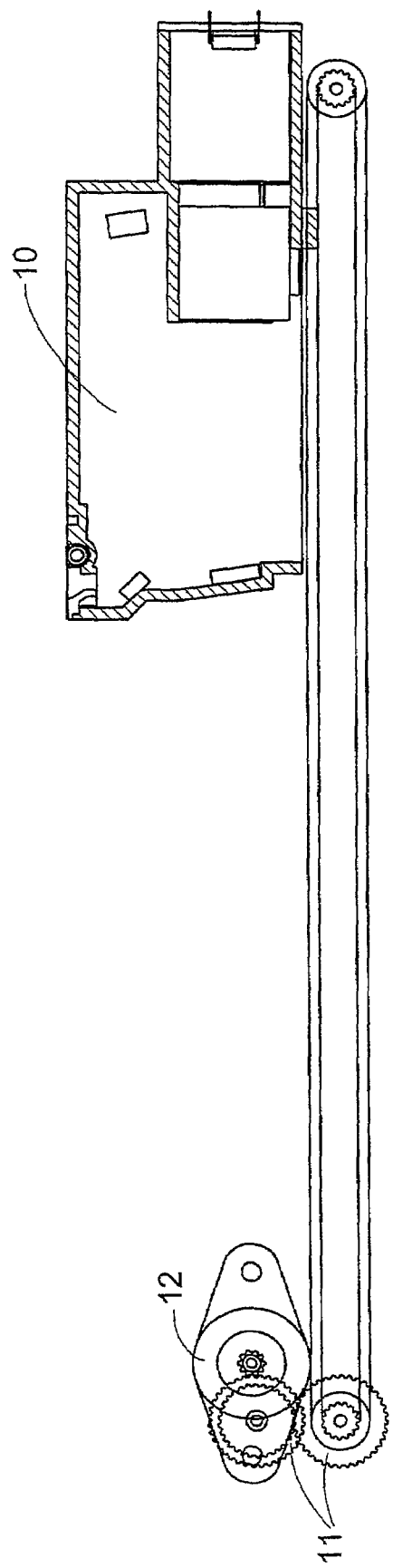
FIG. 1 is a schematic cross-sectional side view of a conventional flatbed scanner.
Figure 4A:
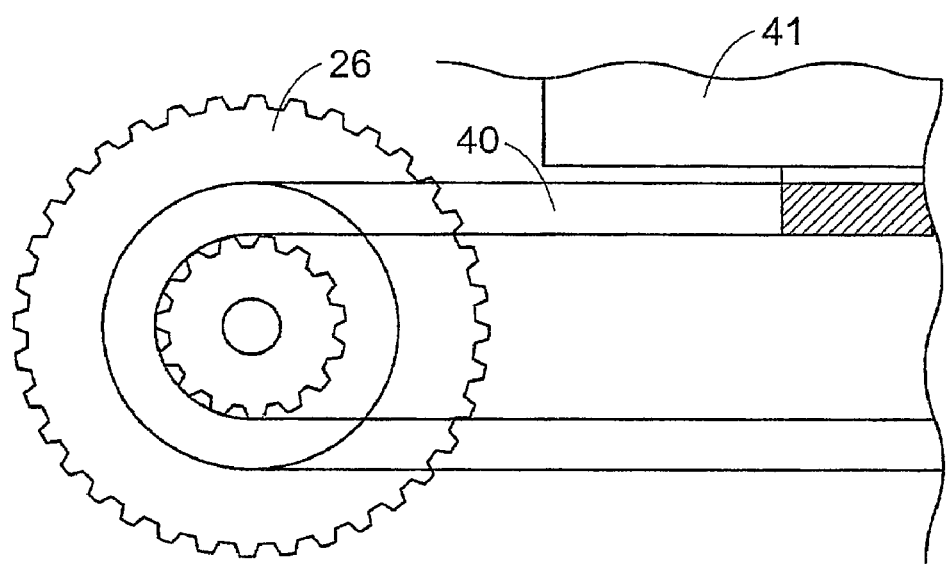
FIGS. 4A and 4B are schematic diagrams illustrating the application of the transmission device of FIG. 2 to a flatbed scanner and an auto-feeding scanner, respectively.

Please refer to FIGS. 2A~2D which illustrate a preferred embodiment of a transmission device according to the present invention used in a flatbed scanner similar to that shown in FIG. 1. The transmission device includes an electromagnetic valve 20 with a rod 201, a holder 21, a stretch spring 22, a control gear set 23, a first and a second transmission gear sets 24 and 25, and a common transmission gear 26. The control gear set 23 includes an active gear 231 concentrically coupled and synchronously rotating with the shaft 271 of a step motor 27, and two follower gears 232 and 233 which are combined together with a swing arm 234. The swing arm 234 has a protruding end 235 heading toward the holder 21. The follower gears 232 and 233 optionally engage with either of the transmission gear sets 24 and 25. The common gear set 26 engages with both of the transmission gear sets 24 and 25, and is sleeved therearound a cyclic belt 40, as shown in FIG. 4A, for moving a carriage 41 installed therein an image pickup device such as a charge-coupled device (CCD) or a contact image sensor (CIS).

Before a scanning operation is performed, the user may give a command for example via a switch mounted on the scanner housing (not shown) to determine the desired resolution. When a relatively high resolution is required, the scanning speed should be lowered. Therefore, a transmission mechanism of a high deceleration ratio is selected to for power transmission. In this embodiment, the first transmission gear set 24 has a relatively high deceleration ratio so as to be suitable for relatively high resolution scanning. On the contrary, when a relatively high scanning speed is required under sacrificed resolution, a transmission mechanism of a low deceleration ratio is selected to for power transmission. In this embodiment, the second transmission gear set 25 has a relatively low deceleration ratio so as to be suitable for relatively low resolution scanning. Hereinafter, the high-low resolution switching operation and the scanning operation performed under the selected speed and resolution will be described with reference to FIGS. 2A~2D and 3A~3B.

Figure 2A:
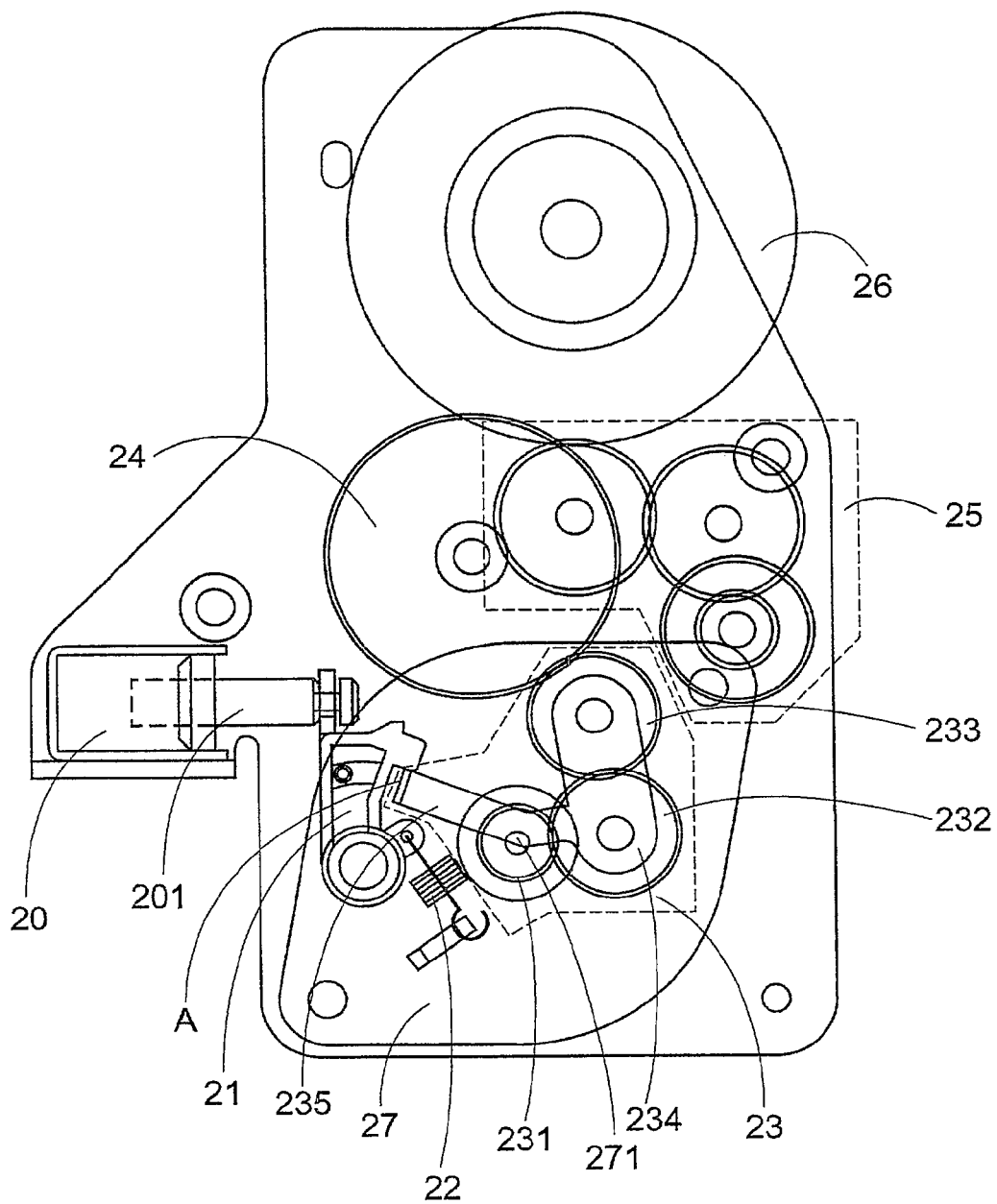
FIGS. 2A~2D are schematic diagrams showing the operations of a preferred embodiment of a transmission device according to the present invention.

FIG. 2A schematically shows that the image scanner performs a high resolution but low speed scanning operation. The follower gears 232 and 233 of the control gear set 23 are made to engage with the first gear set 24 by confining by the holder 21 at a position A. Then the shaft 271 of the step motor 27 rotates in a certain direction, for example counterclockwise, to drive the present transmission device via the transmission path shown in FIG. 3A to transmit the cyclic belt 40, thereby moving the carriage 41 forwards to scan an object to be scanned. When the scanning operation is finished, the shaft 271 rotates in an opposite direction, for example clockwise, to move the carriage 41 back via the same transmission path.

Figure 2B:
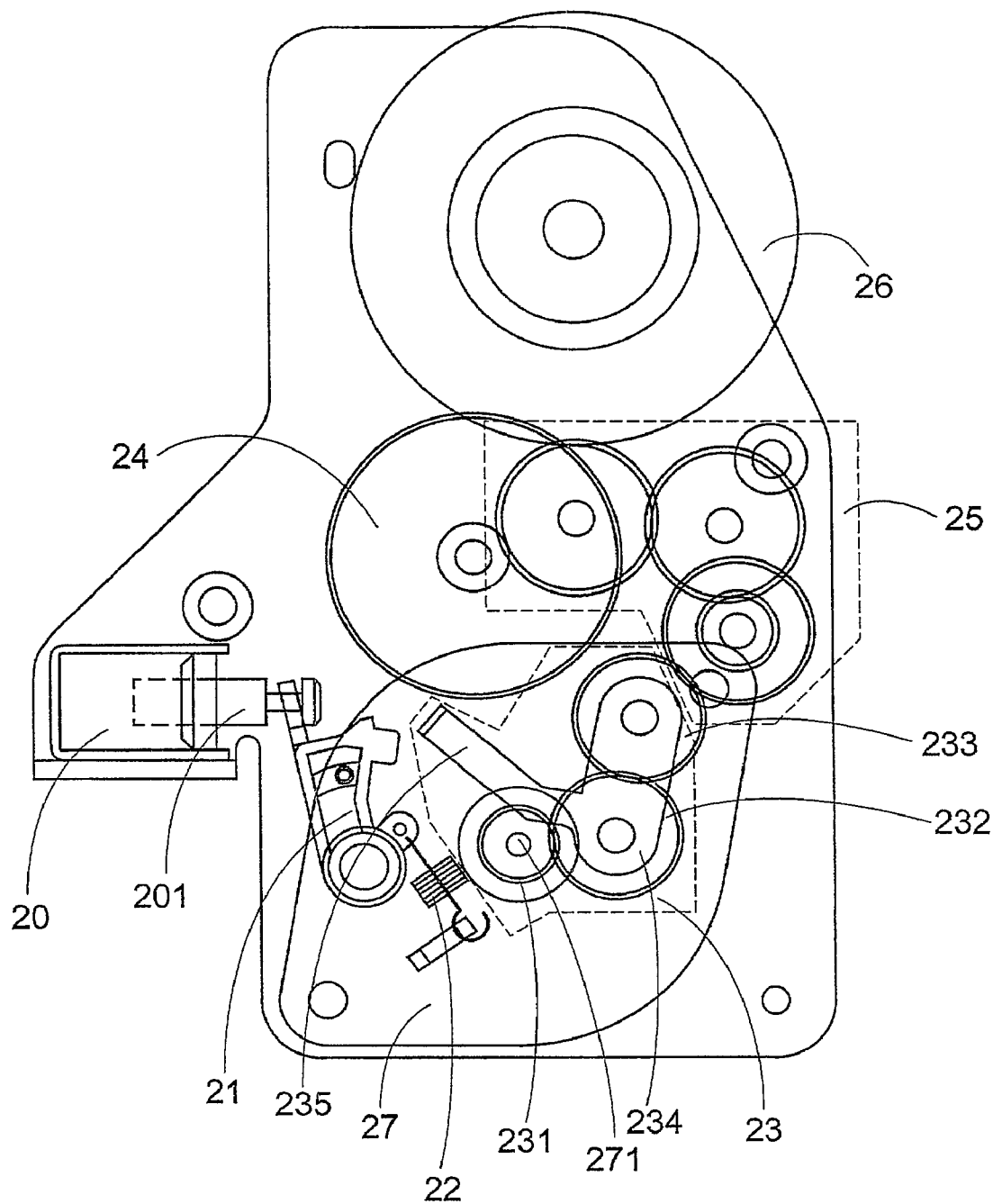
Figure 2C:
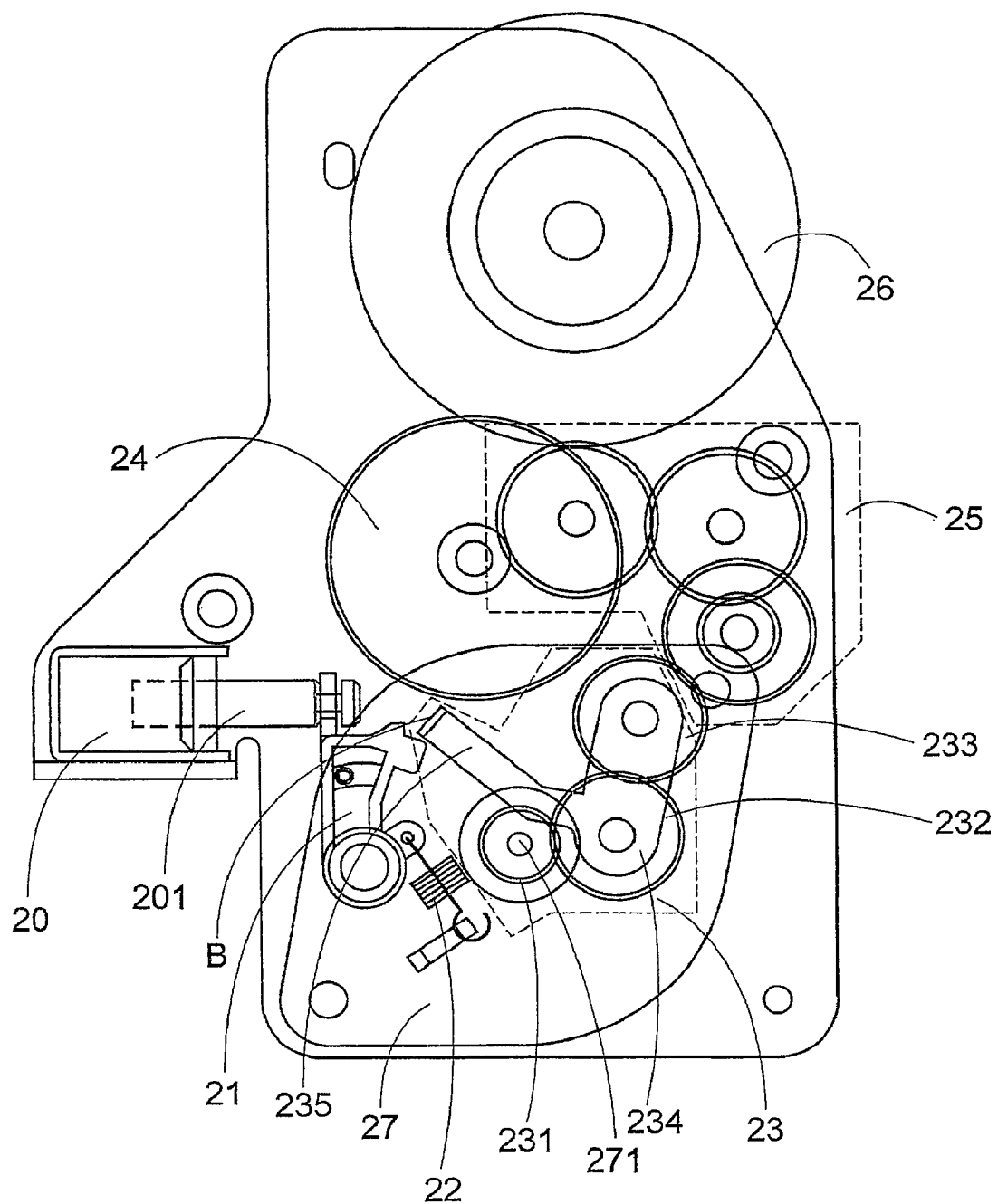

When the scanning operation is desired to be changed to a high scanning speed but low resolution one, the protruding end 235 of the swing arm 234 should be released from the holder 21 first by supplying electricity to the electromagnetic valve 20. The electric-magnetic conversion retracts the rod 201 and thus the holder 21 due to the magnetically attractive force to release the arm 234, as shown in FIG. 2B. Meanwhile, the shaft 271 of the step motor 27 rotates clockwise to have the follower gears 232 and 233 engage with the second transmission gear set 25 so as to change the transmission path to the one shown in FIG. 3B. At this time, the spring 22 stretches under an unstable state due to the retraction of the rod 201 and the holder 21. After the above transmission-path switching operation is completed, the electricity supply to the electromagnetic valve 20 is interrupted. Therefore, the retracting force of the electromagnetic valve 20 working on the rod 201 is retreated, and the spring 22 recovers to its stable state and allows the rod 201 to be protracted from the electromagnetic valve 20. The holder 21 then confines the arm 234 at the position B, referring to FIG. 2C. Then the shaft 271 of the step motor 27 rotates in a certain direction, for example counterclockwise, to drive the present transmission device via the transmission path shown in FIG. 3B to transmit the cyclic belt 40, thereby moving the carriage 41 forwards to scan an object to be scanned. When the scanning operation is finished, the shaft 271 rotates in an opposite direction, for example clockwise, to move the carriage 41 back via the same transmission path.

Figure 2D:
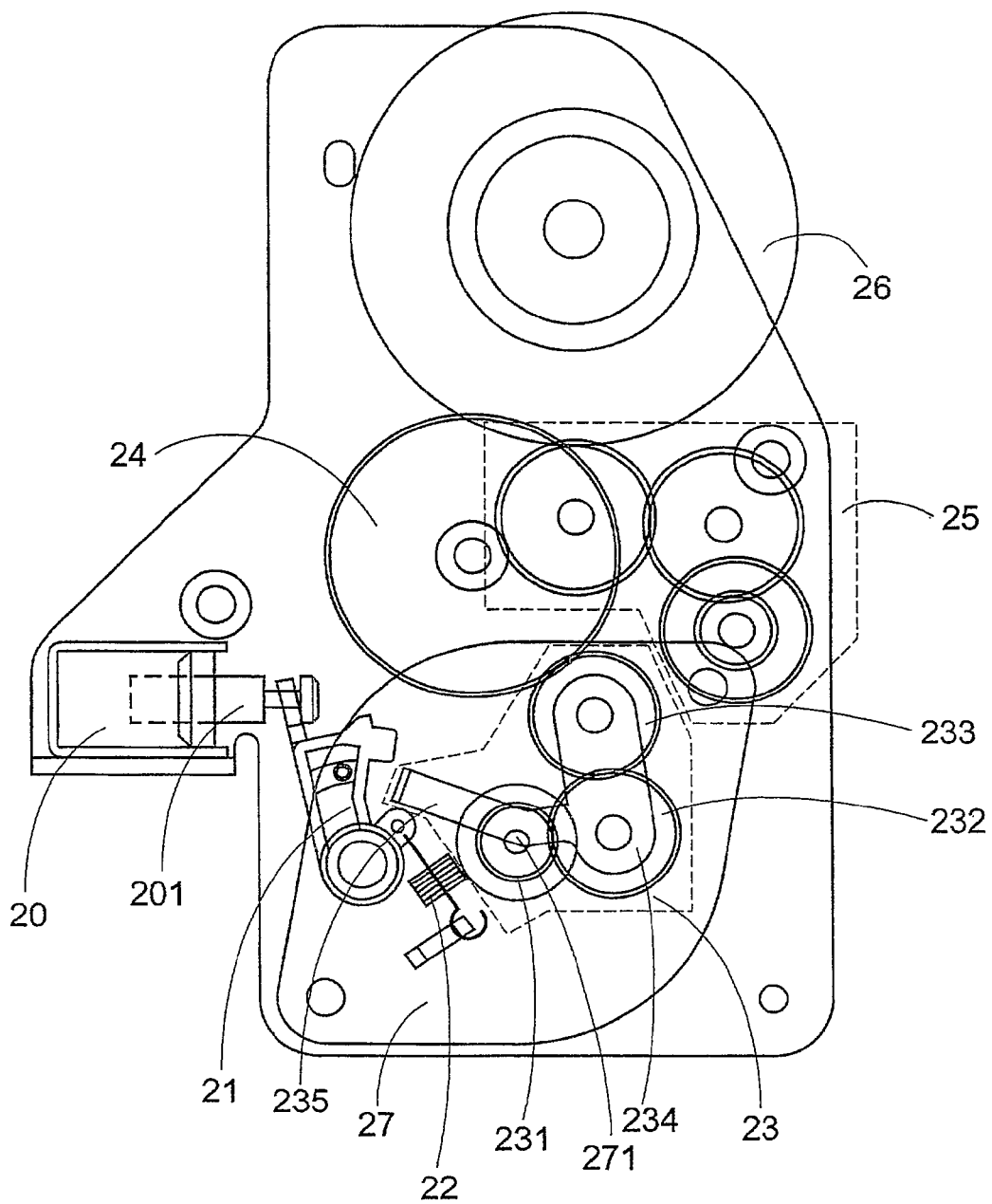
Figure 3A:
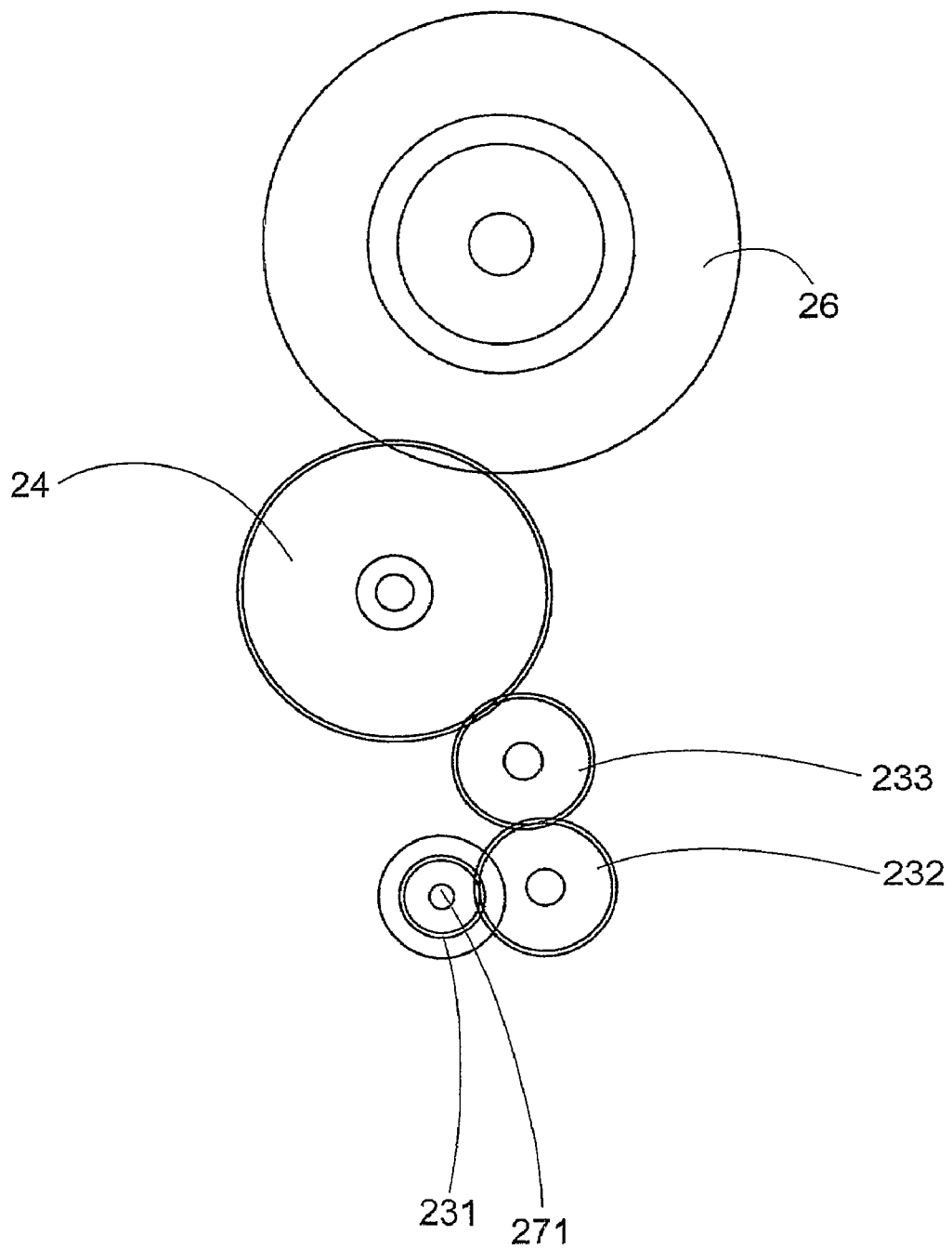
FIGS. 3A and 3B are schematic diagrams showing the optional power transmission paths of the transmission device of FIG. 2.
Figure 3B:
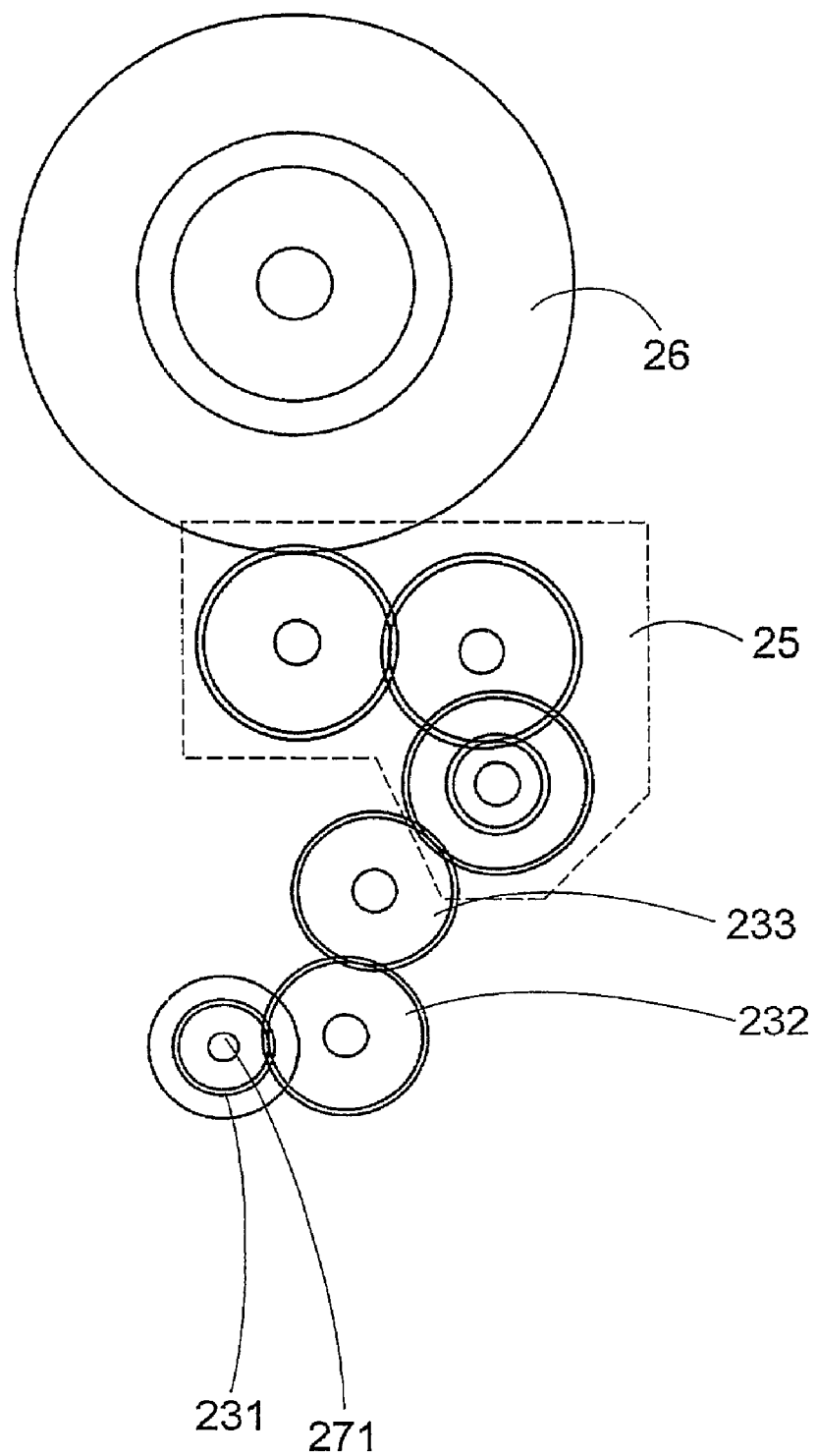

When the scanning operation is desired to be changed to a high scanning resolution but low speed one, the protruding end 235 of the swing arm 234 should be released from the holder 21 again by supplying electricity to the electromagnetic valve 20. The electric-magnetic conversion retracts the rod 201 and thus the holder 21 due to the magnetically attractive force to release the arm 234, as shown in FIG. 2D. Meanwhile, the shaft 271 of the step motor 27 is made to rotate counterclockwise to have the follower gears 232 and 233 engage with the first transmission gear set 24 so as to change the transmission path to the one shown in FIG. 3A. After the above transmission-path switching operation is completed, the electricity supply to the electromagnetic valve 20 is interrupted, and the holder 21 confines the arm 234 at the position A again. Under this circumstance, the moving back and forth operation of the carriage can be performed in an above-mentioned manner.

Figure 4B:
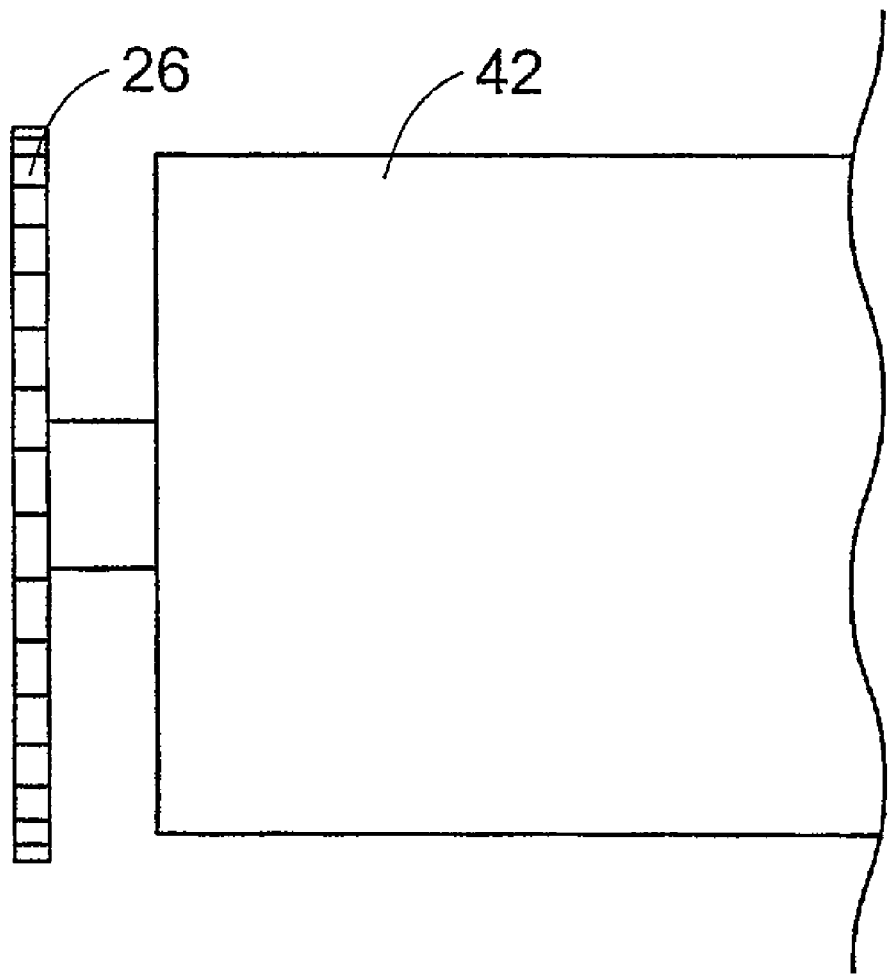

It is to be noted that the transmission device illustrated in the above embodiment is used in a flatbed scanner for moving a carriage, as shown in FIG. 4A. The transmission device according to the present invention, however, can also be used in an auto-feeding scanner to rotate a roller 42 for feeding a document, as shown in FIG. 4B.

By using the present transmission device in an image scanner or any other scanning device requiring multi-level transmission speed adjustment, the transmission speed and thus the resolution can be easily adjusted without raising the torque of the motor. The image scanner according to the present invention is thus quiet and cost-efficiently.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method, comprising:
    switching between a first and a second transmission states in response to a command for changing a moving speed of a carriage via a transmission control set;
    receiving transmission power from said transmission control set in the first transmission state via a first transmission set;
    receiving transmission power from said transmission control set in the second transmission state via a second transmission set;
    synchronously rotating an active gear of said transmission control set with a shaft of a step motor;
    engaging two follower gears of said transmission control set with said active gear for transmission by said active gear;
    swinging a swing arm between a first position to allow said follower gears to engage with said first transmission set and a second position to allow said follower gears to engage with said second transmission set;
    holding said swing arm via a holder of said transmission control set to fix the transmission control set in one of the first and second transmission states to allow said carriage to move at said selected speed; and
    retracting said holder to release said swing arm in order to change said moving speed of said carriage, and protracting said holder to confine said swing arm in one of the first and second positions in order to fix the transmission control set in one of the first and second transmission states for said scanning operation during rotation of the step motor in both clockwise and counter clockwise directions.

2. The method according to claim 1, further comprising:
    swinging said swing arm to said first position in response to a first rotating direction of said shaft of said step motor; and
    swinging said swing arm to said second position in response to a second rotating direction of said shaft opposite to said first rotating direction.

3. The method according to claim 1, further comprising: moving said carriage via a common gear of said first and second transmission sets.

4. An apparatus, comprising:
    a transmission control means for switching between a first and a second transmission states in response to a command for changing a moving speed of a carriage;
    a first transmission means for receiving transmission power from said transmission control means in the first transmission state;
    a second transmission means for receiving transmission power from said transmission control means in the second transmission state;
    wherein said transmission control means comprises an active means for synchronously rotating with a shaft of a step motor;
    two follower means for engaging with said active means for transmission by said active means;
    a swing means for swinging between a first position to allow said follower means to engage with said first transmission means and a second position to allow said follower means to engage with said second transmission means;
    a holder means for selectively holding said swing means to fix the swing means in one of the first and second transmission states to allow said carriage to move at said selected speed; and
    means for retracting said holder means to release said swing means in order to change said moving speed of said carriage, and means for protracting said holder means to confine said swing means in order to fix the swing means in one of the first and second transmission states for a back and forth scanning operation.

5. The apparatus according to claim 4, wherein said first and second gears means comprise a common means for moving said carriage via a cyclic belt.

6. A scanner comprising:
    a first gear set coupled to a common transmission gear;
    a second gear set coupled to the common transmission gear;
    a drive gear coupled to a motor;
    a cyclic belt coupled to the common transmission gear to be driven thereby;
    a carriage comprising an image sensor mounted to the cyclic belt;

a swing arm pivotally mounted concentric with the drive gear;

a transmission gear set secured to the swing arm and meshed with the drive gear; and a holder selectively engaged with the swing arm to retain the swing arm in either a first or second position for both forward and backward movement of the carriage, the transmission gear set meshed with the first gear set in the first position and meshed with the second gear set in the second position.

7. The scanner of claim 6, further comprising an actuator having a locked position and a unlocked position, the actuator positioning the holder to hinder movement of the swing arm in the locked position and permitting movement of the swing arm between the first and second positions in the unlocked position.

8. The scanner of claim 6, wherein the transmission gear set comprises first and second gears meshed with one another, the first gear meshed with the drive gear and the second gear selectively meshed with the first and second gear sets.

9. The scanner of claim 6, wherein common transmission gear is coupled to the drive belt.

10. A method comprising:

disengaging a holder from a swing arm having a transmission gear set secured thereto, the swing arm pivotable concentrically with rotation of a drive gear meshed with the transmission gear set;

actuating the drive gear such that the drive gear urges the swing arm from a first position to a second position, the transmission gear set meshed with a first gear set in the first position and meshed with a second gear set in the second position, the first and second gear sets coupled to a common transmission gear; and reengaging the holder with the swing arm such that the swing arm is retained in the second position for both clockwise and counterclockwise rotation of the drive gear.

11. The method of claim 10, further comprising:

again disengaging the holder from the swing arm;

actuating the drive gear such that the drive gear urges the swing arm from the second position to the first position; and again reengaging the holder to retain the swing arm in the first position.

12. The method of claim 10, wherein disengaging the holder from the swing arm comprises actuating an electromagnetic valve.

13. The method of claim 10, further comprising actuating the drive gear to transmit movement to the common transmission gear.

14. The method of claim 13, wherein the common transmission gear is coupled to a drive belt.

15. The method of claim 14, wherein the drive belt has a scanning module coupled thereto.

16. A transmission device comprising:

a first means for transmitting coupled to a common transmission gear;

a second means for transmitting coupled to the common transmission gear;

a means for driving coupled to a motor;

a means for rotating;

a third means for transmitting mounted to the means for rotating and engaged with the means for driving; and a means for retaining the means for rotating in both a first position for both clockwise and counter clockwise rotation of the motor or a second position for both clockwise and counter clockwise rotation of the motor, the third means for transmitting engaging the first means for transmitting in the first position and engaging the second means for transmitting in the second position.

17. The transmission device of claim 16, further comprising means for urging the means for retaining into and out of engagement with the means for rotating.

* * * * *

UNITED STATES PATENT AND TRADEMARK OFFICE
CERTIFICATE OF CORRECTION

PATENT NO. : 7,729,020 B2
APPLICATION NO. : 11/550572
DATED : June 1, 2010
INVENTOR(S) : Chien It is certified that error appears in the above-identified patent and that said Letters Patent is hereby corrected as shown below:

On the Title Pg
Item (57), under "ABSTRACT", Line 4, after "speed" insert --.--

Column 7
Line 21, after "wherein" insert --the--

Signed and Sealed this

Fourteenth Day of September, 2010

David J. Kappos
*Director of the United States Patent and Trademark Office*